United States Patent [19]
Stephenson

[11] Patent Number: 5,266,968
[45] Date of Patent: Nov. 30, 1993

[54] NON-VOLATILE MEMORY THERMAL PRINTER CARTRIDGE

[75] Inventor: Stanley W. Stephenson, Spencerport, N.Y.

[73] Assignee: Eastman Kodak Company, Rochester, N.Y.

[21] Appl. No.: 858,731

[22] Filed: Mar. 27, 1992

[51] Int. Cl.⁵ .............................................. B41J 2/32
[52] U.S. Cl. ......................... 346/76 PH; 400/207; 400/208; 400/208.1
[58] Field of Search ............... 400/207, 207 E, 208, 400/208.1, 120; 346/76 PH

[56] References Cited

U.S. PATENT DOCUMENTS

| | | | |
|---|---|---|---|
| 4,616,236 | 10/1986 | Watanabe et al. | 400/207 |
| 4,710,781 | 12/1987 | Stephenson | 346/76 PH |
| 4,723,133 | 2/1988 | Walter | 346/134 |
| 4,786,917 | 11/1988 | Hauschild et al. | 346/76 PH |
| 4,797,018 | 1/1989 | Hofmann et al. | 400/207 E |
| 4,893,951 | 1/1990 | Iwatani et al. | 400/225 |
| 5,035,325 | 7/1991 | Kitsuki | 206/459 |
| 5,138,344 | 8/1992 | Ujita | 346/140 |

FOREIGN PATENT DOCUMENTS 0310987 12/1989 Japan .................... 400/207 E

OTHER PUBLICATIONS

Dallas Semiconductor "Memory Button", part series 199x.

Primary Examiner—Benjamin R. Fuller
Assistant Examiner—Huan Tran
Attorney, Agent, or Firm—Thomas H. Close; Kevin A. Sembrat

[57] ABSTRACT

A non-volatile memory is mounted on a cartridge for a thermal printer and includes color correction and carrier defect data which are used by the printer to make prints.

6 Claims, 4 Drawing Sheets

NON-VOLATILE MEMORY THERMAL PRINTER CARTRIDGE

FIELD OF THE INVENTION

The present invention relates to thermal printers for printing colored images which uses a carrier having a repeating series of spaced dye frames of different colored dyes.

BACKGROUND OF THE INVENTION

In one type of thermal printing which prints colored images, a carrier contains a repeating series of spaced frames of different colored heat transferrable dyes. In such apparatus, the carrier is disposed between the receiver and a print head formed of, for example, a plurality of individual heating elements. When a particular heating element is actuated, it produces heat and causes dye from the carrier to transfer to the receiver. The density or darkness of printed colored dye is a function of the energy delivered from the heating element to the carrier.

Thermal dye transfer printers offer the advantage of true "continuous tone" dye density transfer. This result is obtained by varying the energy applied from each heating element, yielding a variable dye density image pixel in the receiver.

In order to produce a colored image, the carrier includes a repeating series of spaced colored dye frames. Such frames are often yellow, magenta and cyan dye frames. The carrier is typically mounted in a cartridge which includes take-up and supply spools. Under the control of a microprocessor, the carrier and receiver are moved past the heating elements which are selectively actuated.

There is a problem with this arrangement in that there sometimes are defective dye frames in the cartridge. If a single dye frame in a series is defective, then an unsatisfactory print will be produced by the thermal printer. Another problem is that the color dye densities in the dye frames may vary from cartridge to cartridge. Since the print head is set up for a standard series of dye frames, this also can cause less than satisfactory prints to be produced.

SUMMARY OF THE INVENTION

It is an object of this invention to provide a simple and effective way of identifying a defective series of dye frames in a cartridge.

It is a further object of this invention to provide for the correction of variations in dye densities from cartridge to cartridge.

This object is achieved in a thermal printer which uses a cartridge for mounting a carrier, such carrier having repeating series of dye frames of different colors and a receiver which receives dye from a series of spaced dye frames to form a colored image, such printer including a print head having one or more selectively actuable elements, means for moving the carrier and the receiver along respective paths so as to sequentially move each dye frame of a series and the receiver relative to the print head so that as the elements are actuated, dye from each dye frame of a series is transferred to the receiver and forms a colored image in the receiver, the improvement comprising:

(a) means for identifying each particular dye frames series in the carrier and producing a signal;

(b) non-volatile memory means associated with each cartridge and including data as to the location of each defective series of dye frames in the carrier; and (c) computer means responsive to the identifying signals and the stored defective series information for causing the carrier and receiver means to move only non-defective dye series frames in operative relation with the receiver when the print head is actuated.

An advantage of this invention is that if a cartridge is removed from the printer, it can be reinserted and it will control the carrier so that the only non-defective series are moved into operative position in the printer.

Under current carrier production techniques, there can be variations of up to 15% in the dye color density from desired levels in carriers. Another important advantage is that, by having color correction data stored in each non-volatile memory for each cartridge, the process can be controlled by using such stored color correcting data to minimize non-uniformities in output prints.

DETAILED DESCRIPTION OF THE INVENTION

Figure 1:
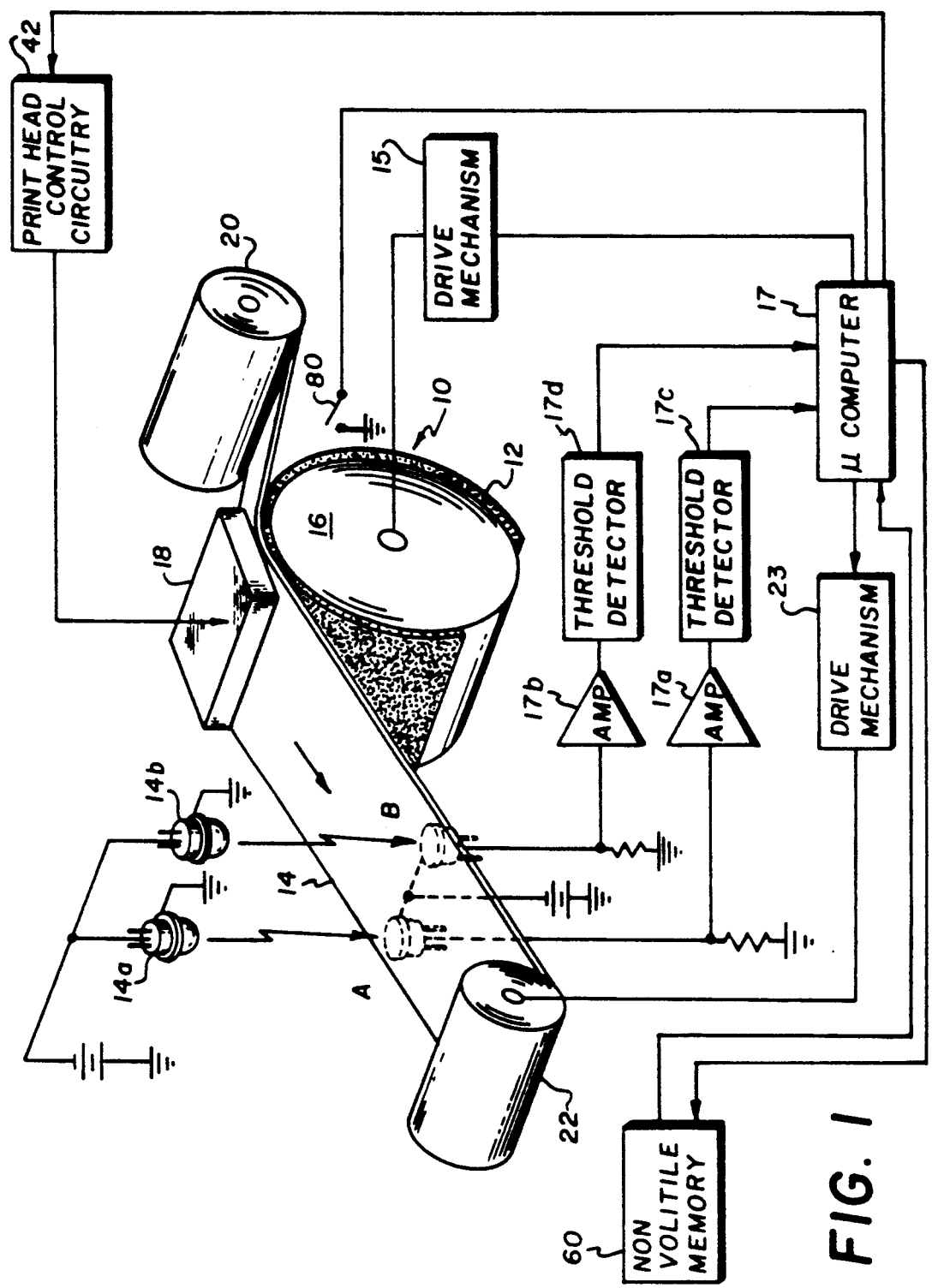
FIG. 1 is a schematic of a thermal printer which can be employed to make color images in a receiver in accordance with this invention.

Referring to FIG. 1, the receiver member 12 is in the form of a sheet and is secured to a rotatable drum 16 which is mechanically coupled to a drive mechanism 15. The drive mechanism 15 continuously advances the drum 16 and the receiver sheet 12 along a path past the stationary print head 18 during the cycle for actuating elements of the print head 18.

Figure 2:
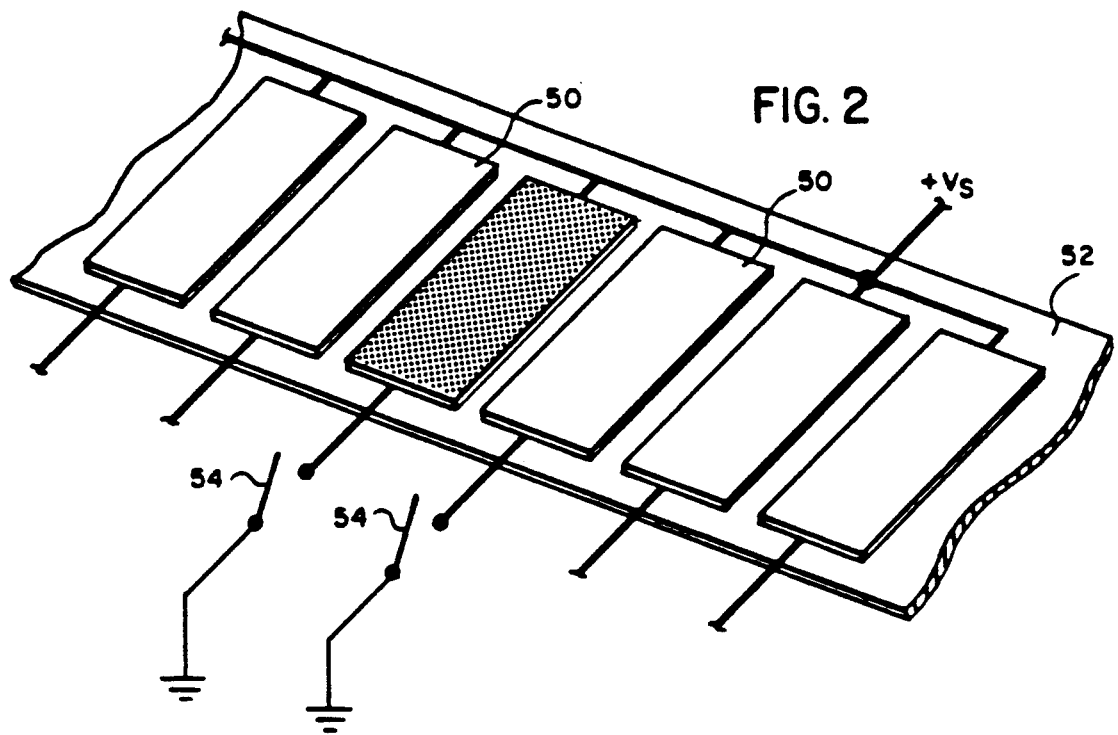
FIG. 2 is a perspective of several heating elements used in the print head of the printer of FIG. 1.

Turning to FIG. 2, we see further details of print head 18. The print head in this embodiment includes a plurality of heating resistors 50 which are pressed against a carrier 14 and force the carrier against the receiver member 12. As shown in FIG. 2, when a switching element 54 is closed, a heating element 50 is connected to a potential source $V_s$ and actuated. The amount of dye transferred is a function of the time switch 54 is closed.

The carrier member is driven along a path from a supply spool 20 onto a take-up spool 22 by a drive mechanism 23 coupled to the take-up spool 22. The supply and take-up spools are shown in more detail in FIG. 4 which will be discussed later. For clarity of illustration, the cartridge has not been shown in FIG. 1. The drive mechanisms 15 and 23 each include motors which respectively advance the carrier 14 and the receiver 12 in operative relation to the print head 18 as the various heating elements are selectively actuated to transfer dye.

Figure 3:
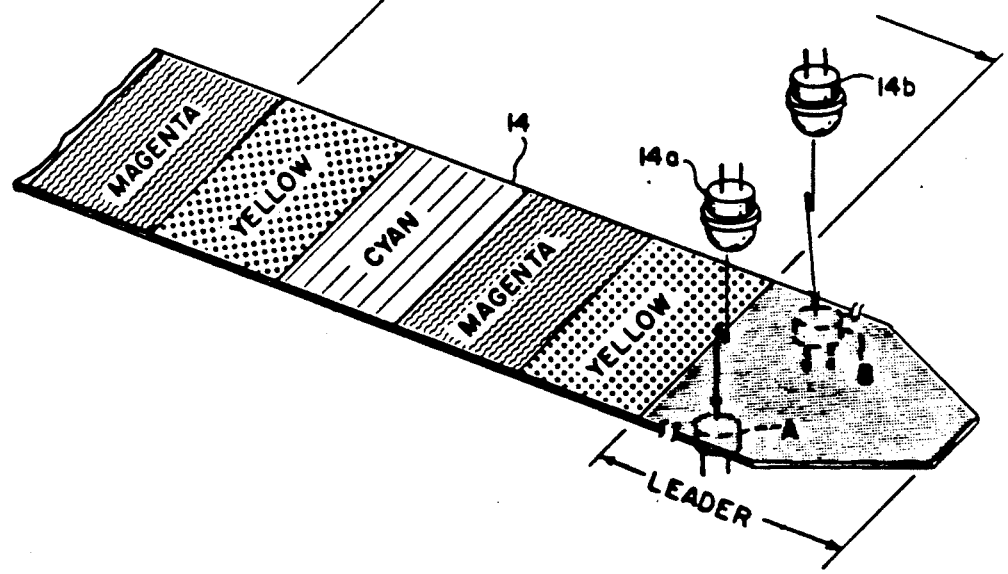
FIG. 3 shows a portion of a typical carrier.

The carrier member 14 is as noted above formed with a repeating series of thermally transferrable dye frames. As shown in FIG. 3, each series includes yellow, magenta and cyan dye frames. A single series is of course used to print one colored image in the receiver 12. As we will see, the present invention corrects for a defective series which would be when at least one dye frame has an incorrect dye color density.

In this disclosure, the term "dye" refers to a colored material which transfers from the carrier to a receiver in response to energy applied by individual elements of the print head 18. Although the print head 18 is shown as having heat resistor elements, those skilled in the art will understand that other sources of energy such as, diode laser array and individual lasers have been and can be effectively used in accordance with this invention. After a colored image is formed in a receiver, the receiver will be referred to as a print.

Referring now to FIGS. 1 and 3, we see that each dye frame extends across the width of the carrier 14. The carrier 14 comprises a leader portion followed by a repeating series of dye frames. The dye frames are contiguous and each series includes in sequence yellow, magenta and cyan dye frames. As shown, there are two LEDs 14a and 14b which illuminate the carrier from above. LED 14a emits yellow light and LED 14b emits red light. Photodetectors A and B are disposed below the carrier and receive light which passes through the carrier. Photodetector A provides a signal to amplifier 17a and photodetector B provides a signal to amplifier 17b. Threshold detectors 17c and 17d respectively are connected to the output of amplifiers 17a and 17b. If the signal produced by an amplifier is above a predetermined threshold level, then a logic 1 is provided by the threshold level detector to a $\mu$ computer (microcomputer) 17. If it is below a threshold level, then a logic 0 is provided to the microcomputer 17. The microcomputer 17 in response to these signals identifies the start of series and each individual color dye frame in such series. For a more complete discussion of this identification, reference is made to commonly assigned U.S. Pat. No. 4,710,781 to Stephenson, the disclosure of which is incorporated by reference herein. It will be understood to those skilled in the art that other types of well known apparatus can be used to identify the start of each series of colored dye frames. See U.S. Pat. No. 4,893,951.

Figure 4:
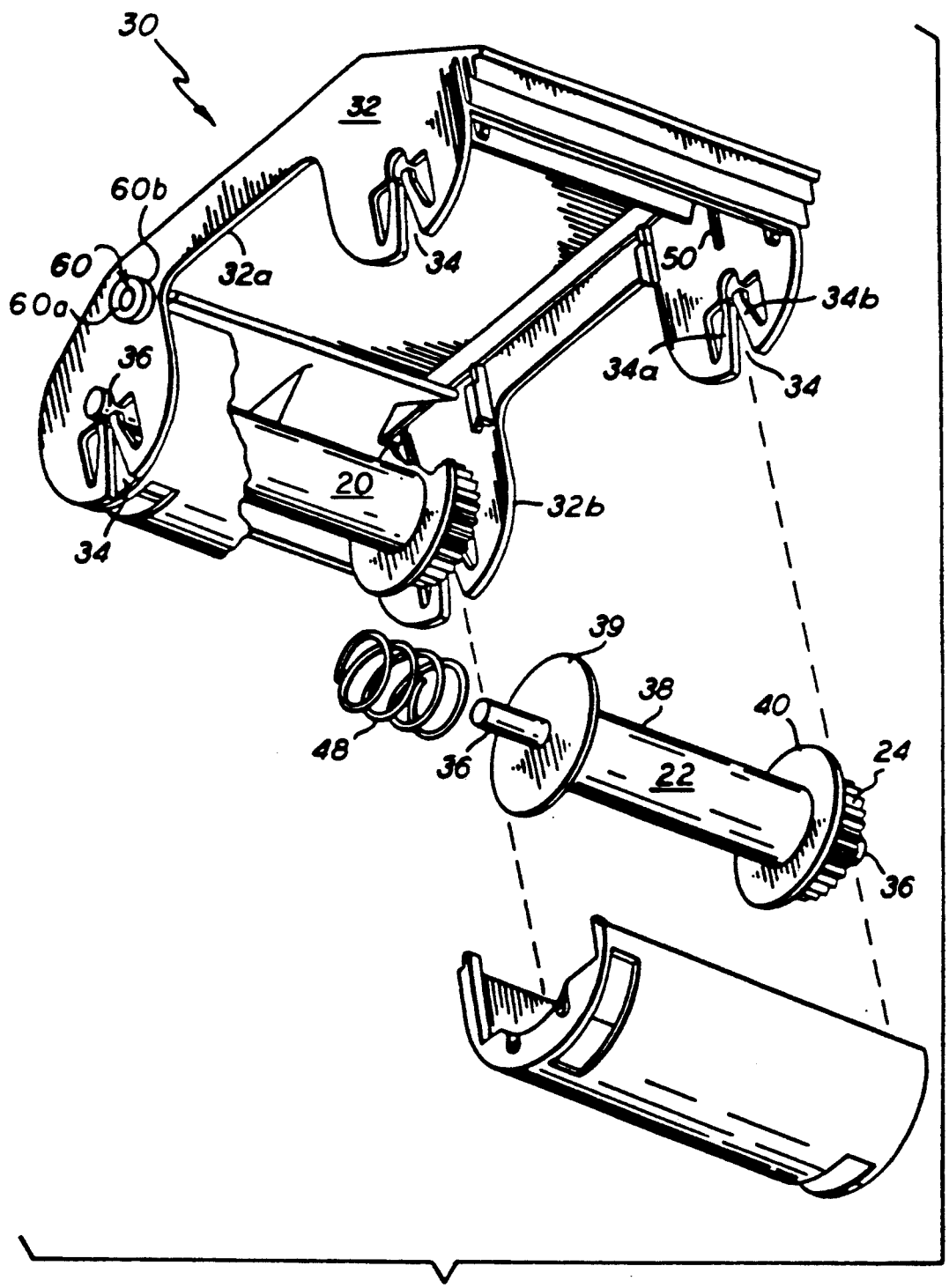
FIG. 4 is an exploded view of a cartridge containing a nonvolatile memory which can be mounted in the printer of FIG. 1.

Turning now to FIG. 4, we see an exploded view of a cartridge 30 for the web-type carrier 14. The cartridge includes a body 32 which may be formed of an injection molded plastic. The body 32 includes two pairs of identical, spaced-apart flanges 32a and 32b. Each of the flanges includes detents 34. Each detent is adapted to rotatably capture a spindle 36 of its corresponding spool. The detent 34 is composed of two integral spring members 34a and 34b which deflect apart when the spindle 36 is inserted. After insertion, the spring members return to their free position and the spindle 36 is free to rotate, but is spatially retained within its corresponding flange.

Mounted on the cartridge is a non-volatile memory 60. This memory can be in the form of RAM with a permanent supply battery. One non-volatile memory that can be used is Dallas Semiconductor "Memory Button", part series 199x. The unit is a small battery-like can having two seperable electrically conductive surfaces (60a and 60b). A two point electrical communication format allows for the communication to the battery-backed memory element in the device. Two electrically separated contacts disposed within the printer provide a communication link between the printer and cartridge when the cartridge is inserted into the printer. Sets of other electrical components can be assembled into the cartridge to provide non-volatile data storages. Communication between the smart cartridge and printer can be accomplished using two or more wires or by the use of opto-electrical or radio frequency communication.

Both the supply spool 20 and take-up spool 22 are identical in construction and so only one need be described. Each of these spools includes a cylindrical portion 38 about which the web-type carrier 14 is wound. Guard members 39 and 40 are respectively secured to the opposite ends of the central portion 38. Their purpose is to align the spooled carrier 14 between them. As shown, the spindles 36 extend outwardly from their respective guide members 39 and 40 and terminate in a free end. A gear member 24 is fixed to a spindle 36 and disposed between guide member 40 and the free end of a spindle 36. The gear 24 tooth design is such that a portion extends out beyond the face of the gear in a direction parallel to the axis of spindle 36. Two adjacent teeth form a groove along the face of the gear 24 nearest to the free end of the spindle 36. A coil spring 48 urges each spool so that the face grooves of the gears 24 engage ribs 50 formed on flange 32b to prevent the spools from rotating when the cartridge is removed from the printer. This is especially advantageous during handling as it prevents the carrier 14 from unwinding.

When the cartridge is inserted into the printer, such as disclosed in commonly assigned U.S. Pat. No. 4,723,133 to Walter, the non-volatile memory is electrically connected to the $\mu$ computer 17 as shown.

Figure 5:
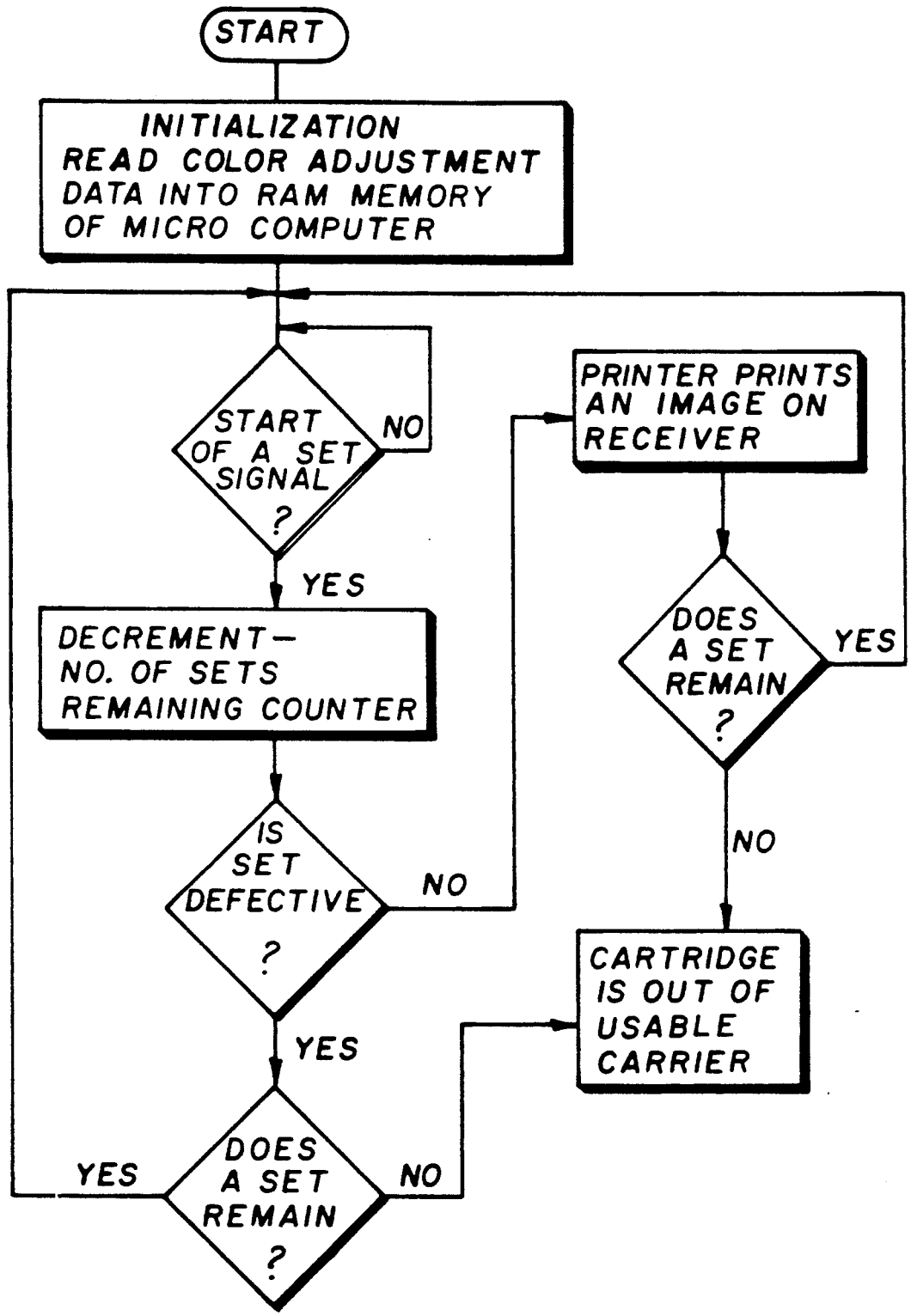
FIG. 5 is a flowchart for the correction for a defective series carrier by the printer of FIG. 1.

The operation of the $\mu$ computer 17 for controlling the operation of the printer 10 will now be explained with reference to the flowchart of FIG. 5.

The non-volatile memory 60 can be preprogrammed with a counter that indicates the number of sets remaining to be used. It will also contain color-adjustment data which will be transferred into RAM memory of microcomputer 17 to change the color and contrast information to modify the output color image based upon variations in the color dye density of the colored dye frames of the receiver from desired levels. For a more complete discussion of color signal processing which can be used in accordance with this invention, reference is made to commonly assigned U.S. Pat. No. 4,786,917 to Hauschild et al, the disclosure of which is incorporated by reference herein.

Other functions are also initialized, but they will not be discussed since they are not necessary to understand the invention. The mechanism 15 advances the carrier until, in response to start of set signals provided by threshold detectors 17a and 17b, after the microprocessor 17 recognizes a start of series signal, it decrements the number of series remaining counter in memory 60. The carrier has been preexamined and a defect location map is stored in the memory 60 which indicates the location or position of each defective series of frames in the carrier 14. If a series is defective, and the cartridge is out of usable carrier (the number of sets remaining is "0"), the $\mu$ computer 17 signals an indication on a display (not shown) that the cartridge 30 needs to be replaced. If a set remains, then the $\mu$ computer 17 causes the drive mechanism to advance the carrier and the above process is repeated. When a series is not defective, the printer 10 would print an image in a receiver 12 as discussed above. During this time, the color correction data is used by the print head control circuitry to vary the actuation time of resistors 50 of the print head 18 as is well known in the art. After the print is made, if a series remains, the above process is repeated. If a non-defective carrier series does not remain, then the display will be caused to indicate that the cartridge is out of usable carrier.

When the cartridge 30 is removed from the printer to make, for example, special colored prints, after it is replaced the carrier 14 will be advanced until the first fresh (non-used) and non-defective series is presented under the print head 18. Everytime a cartridge is replaced, the above discussed initialization process takes place.

The invention has been described in detail with particular reference to a certain preferred embodiment thereof, but it will be understood that variations and modifications can be effected within the spirit and scope of the invention.

I claim:

1. A thermal printer which uses a cartridge containing a dye carrier, such carrier having repeating series of spaced dye frames of different colors and a receiver which receives dye from said series of spaced dye frames to form a colored image, such printer including a print head having a plurality of selectively actuable elements, means for moving the carrier and the receiver along respective paths so as to sequentially move dye frames of said series of spaced dye frames and the receiver relative to the print head so that as the elements are actuated, dye from each dye frame of a series is transferred to the receiver and forms a colored image in the receiver, the improvement comprising:
   a) means for identifying each particular dye frames series in the carrier and producing an identifying signal;
   b) non-volatile memory means associated with said cartridge and including data as to a location of each defective series of dye frames in the carrier; and
   c) computer means responsive to said identifying signal and said location data for causing the carrier and receiver moving means to advance the carrier to a non-defective dye series frame in operative relation with the receiver when the print head is actuated.

2. The thermal printer of claim 1 wherein the non-volatile memory includes color correcting data; and the computer means responds to said color correction data to adjust the actuation of the elements to compensate for variations in color density from desired levels.

3. The thermal printer of claim 1 wherein said non-volatile memory means is a Random Access Memory.

4. A thermal printer which uses a cartridge containing a dye carrier, such carrier having repeating series of spaced dye frames of different colors, and a receiver which receives dye from a repeating series of spaced dye frames of different colors to form a colored image, such printer including a print head having a plurality of selectively actuable elements, means for moving the carrier and the receiver along respective paths so as to sequentially move dye frames of said repeating series of spaced dye frames and the receiver relative to the print head so that as the elements are actuated dye from dye frames of said series of spaced dye frames is transferred to the receiver and forms a colored image in the receiver, the improvement comprising:
   a) means for identifying each particular dye frames series in the carrier and producing a signal;
   b) non-volatile memory means associated with said cartridge for including color density correcting data; and
   c) computer means responsive to the color density correcting data for adjusting an actuation of the elements to compensate for variations in color density from desired levels.

5. The thermal printer of claim 4 wherein said n volatile memory means is a Random Access Memory.

6. The thermal printer of claim 4 wherein said non-volatile memory means is a Random Access Memory.

* * * * *